United States Patent
Kawashima et al.

(10) Patent No.: US 10,284,131 B2
(45) Date of Patent: May 7, 2019

(54) MOTOR-DRIVEN COMPRESSOR FOR A VEHICLE

(71) Applicant: KABUSHIKI KAISHA TOYOTA JIDOSHOKKI, Kariya-shi, Aichi-ken (JP)

(72) Inventors: Takashi Kawashima, Kariya (JP); Yoshiki Nagata, Kariya (JP); Satoshi Okada, Kariya (JP); Fumihiro Kagawa, Kariya (JP); Kazuki Najima, Kariya (JP); Hiroshi Fukasaku, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/935,188

(22) Filed: Mar. 26, 2018

(65) Prior Publication Data
US 2018/0287543 A1    Oct. 4, 2018

(30) Foreign Application Priority Data

Mar. 28, 2017   (JP) .................. 2017-062525

(51) Int. Cl.
*F04B 49/10*   (2006.01)
*H02P 27/06*   (2006.01)
*F04D 25/06*   (2006.01)
*F04D 27/00*   (2006.01)
*B60H 1/32*    (2006.01)
(Continued)

(52) U.S. Cl.
CPC ............ *H02P 27/06* (2013.01); *B60H 1/3211* (2013.01); *B60H 1/3222* (2013.01); *F04B 49/02* (2013.01); *F04B 49/06* (2013.01); *F04B 49/10* (2013.01); *F04D 25/068* (2013.01); *F04D 27/001* (2013.01); *H02M 7/5387* (2013.01); *B60H 2001/3292* (2013.01); *H02M 7/003* (2013.01); *H02M 2001/322* (2013.01)

(58) Field of Classification Search
CPC .......... F04B 49/00; F04B 49/02; F04B 49/06; F04B 49/10
USPC ................ 318/471–473, 432–433, 481, 645
See application file for complete search history.

(56) References Cited

U.S. PATENT DOCUMENTS 5,663,627 A * 9/1997 Ogawa .................. F25B 49/025
                                                    318/803
5,828,207 A * 10/1998 Saadeh ...................... G06F 1/30
                                                    323/281

(Continued)

FOREIGN PATENT DOCUMENTS

JP    4898964 B1    3/2012
JP    5135161 B2    1/2013

*Primary Examiner* — Bentsu Ro
(74) *Attorney, Agent, or Firm* — Sughrue Mion, PLLC (57) ABSTRACT

A motor-driven compressor for a vehicle includes a housing, a compression unit, a motor, and an inverter device. The inverter device includes an inverter circuit, a capacitor, a current sensor, a determination means configured to control switching elements in response to the current sensor not detecting a flow of current when the motor stops operating and configured to determine whether or not the current sensor detects a flow of current when controlling the switching elements, and a discharge starting means configured to start discharging the capacitor when the determination means determines that the flow of current has not been detected.

4 Claims, 7 Drawing Sheets

(51) Int. Cl.
*H02M 7/5387* (2007.01)
*F04B 49/06* (2006.01)
*F04B 49/02* (2006.01)
F04B 49/00 (2006.01)
H02M 7/00 (2006.01)
H02M 1/32 (2007.01)

(56) References Cited

U.S. PATENT DOCUMENTS

| | | | |
|---|---|---|---|
| 2004/0074255 A1* | 4/2004 | Goto | B60H 1/00428 |
| | | | 62/498 |
| 2006/0097671 A1* | 5/2006 | Yoshida | B60K 6/48 |
| | | | 318/109 |
| 2011/0280053 A1* | 11/2011 | Halberstadt | H02M 3/155 |
| | | | 363/126 |
| 2014/0009091 A1 | 1/2014 | Kamiya et al. | |
| 2015/0061558 A1* | 3/2015 | Yano | F04B 39/121 |
| | | | 318/400.26 |
| 2015/0357844 A1* | 12/2015 | Koide | H05K 1/0254 |
| | | | 318/139 |

* cited by examiner

MOTOR-DRIVEN COMPRESSOR FOR A VEHICLE

BACKGROUND OF THE INVENTION

The present invention relates to a motor-driven compressor for a vehicle, more specifically, to a technique for detecting when a capacitor starts discharging.

Japanese Patent No. 4898964 discloses a motor-driven compressor including a capacitor, a current detection means, and a load resistor. The capacitor is connected to a power supply line and a ground line. The current detection means is arranged on the power supply line between the capacitor and a power source connection means. The current detection means detects whether the current flowing from a power source toward a power element is positive or negative. The load resistor is located between the current detection means and the power source connection means. The load resistor connects the power supply line to the ground line. When current flows from the power element toward the power source, disconnection of the power source from the power source connection means is detected. When the power source is disconnected, the power source stops supplying current to the capacitor. Thus, the capacitor starts discharging the accumulated electric charges so that the discharged electric charges flow to the load resistor.

A typical motor-driven compressor for a vehicle includes a housing, a compression unit, a motor, and an inverter device. The compression unit and the motor are arranged in the housing. The motor-driven compressor may include a resistor located between a connector, which is connected to a power source, and a capacitor across the power source and ground. The motor-driven compressor may further include a current sensor located between the resistor and the capacitor. In this case, disconnection of the connector from the power source is determined when current flows to the current sensor in a direction opposite to when the motor is operating. The resistor is connected in parallel to the capacitor. Thus, power is consumed even during normal operation of the motor. This may lower the efficiency of the motor-driven compressor and generate heat that damages elements.

SUMMARY OF THE INVENTION

It is an object of the present invention to provide a motor-driven compressor for a vehicle that reduces power consumption and starts discharging a capacitor when a line that supplies an inverter circuit with power is interrupted when the motor stops operating.

A motor-driven compressor for a vehicle that achieves the above object includes a housing, a compression unit arranged in the housing, a motor arranged in the housing and configured to drive the compression unit, and an inverter device that supplies the motor with power. The inverter device includes an inverter circuit including a plurality of switching elements that are bridge-connected between a positive electrode bus bar and a negative electrode bus bar that are connected to a DC power source. The inverter circuit is configured to drive the motor by executing activation and deactivation control on the switching elements to convert DC power from the DC power source into AC power and supply the AC power to a coil of the motor. The inverter device further includes a capacitor connected to the positive electrode bus bar and the negative electrode bus bar between the inverter circuit and the DC power source, a current sensor located between the capacitor and the DC power source on the positive electrode bus bar or the negative electrode bus bar, a determination means configured to control the switching elements in response to the current sensor not detecting a flow of current when the motor stops operating and configured to determine whether or not the current sensor detects a flow of current when controlling the switching elements, and a discharge starting means configured to start discharging the capacitor when the determination means determines that the flow of current has not been detected.

A motor-driven compressor for a vehicle that achieves the above object includes a housing, a compression unit arranged in the housing, a motor arranged in the housing and configured to drive the compression unit, and an inverter device that supplies the motor with power. The inverter device includes an inverter circuit including a plurality of switching elements that are bridge-connected between a positive electrode bus bar and a negative electrode bus bar that are connected to a DC power source, wherein the inverter circuit is configured to drive the motor by executing activation and deactivation control on the switching elements to convert DC power from the DC power source into AC power and supply the AC power to a coil of the motor, a capacitor connected to the positive electrode bus bar and the negative electrode bus bar between the inverter circuit and the DC power source, a current sensor located between the capacitor and the DC power source on the positive electrode bus bar or the negative electrode bus bar, and circuitry. The circuitry is configured to control the switching elements in response to the current sensor not detecting a flow of current when the motor stops operating and is configured to determine whether or not the current sensor detects a flow of current when controlling the switching elements, and the circuitry is configured to start discharging the capacitor when determining that the flow of current has not been detected.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

A motor-driven compressor for a vehicle of the present embodiment is used with, for example, a vehicle air conditioner. Refrigerant as a fluid is to be compressed in the motor-driven compressor in the present embodiment.

Figure 1:
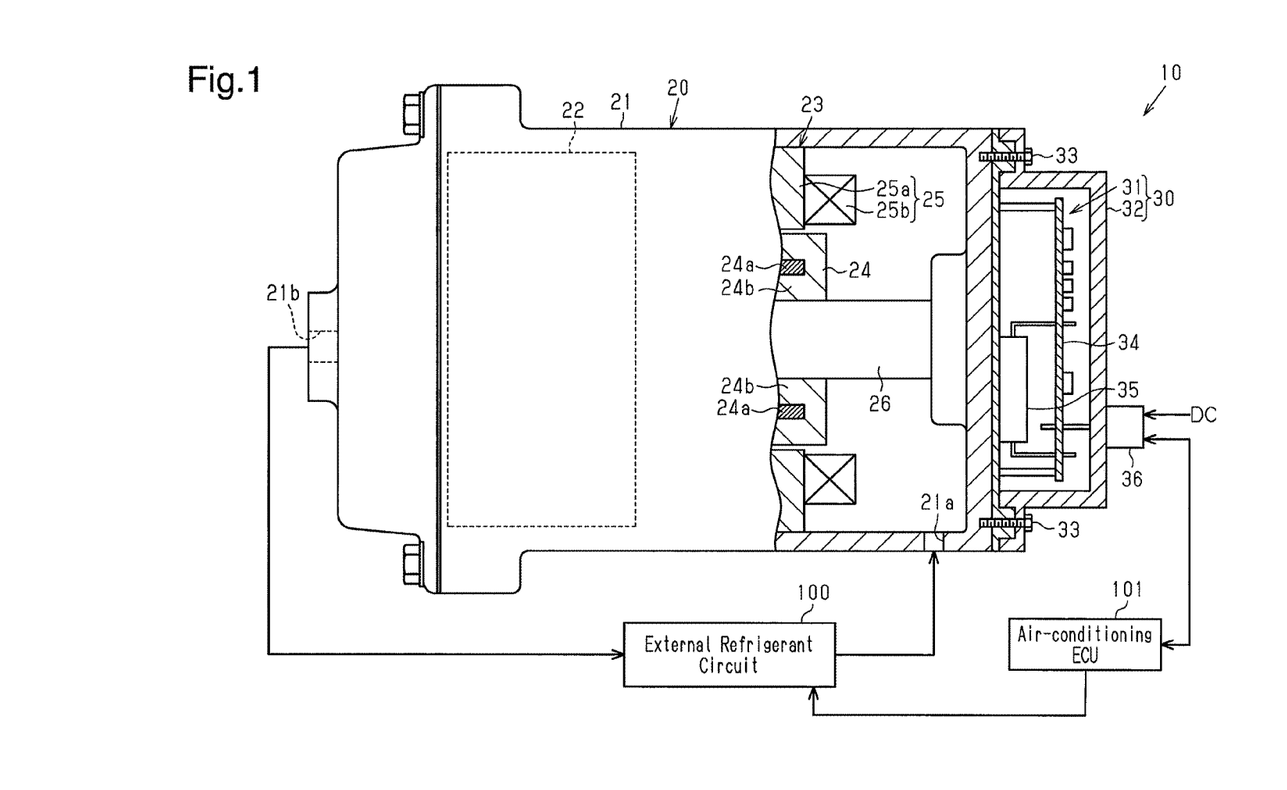
FIG. 1 is a partial cutaway view schematically showing one embodiment of a motor-driven compressor for a vehicle.

As shown in FIG. 1, an air conditioner 10 for a vehicle includes a motor-driven compressor 20 and an external refrigerant circuit 100 that supplies the motor-driven compressor 20 with refrigerant. The external refrigerant circuit 100 includes, for example, a heat exchanger and an expansion valve. The air conditioner 10 compresses refrigerant with the motor-driven compressor 20 and exchanges heat with and expands the refrigerant with the external refrigerant circuit 100. This cools and heats the passenger compartment of the vehicle.

The air conditioner 10 includes an air-conditioning ECU 101 that controls the entire air conditioner 10. The air-conditioning ECU 101 is configured to acknowledge, for example, a passenger compartment temperature and a preset temperature. Based on these parameters, the air-conditioning ECU 101 transmits various instructions such as activation and deactivation instructions to the motor-driven compressor 20.

The motor-driven compressor 20 includes a housing 21, a compression unit 22, and a three-phase motor 23 for a vehicle. The housing 21 includes a suction port 21a into which refrigerant is drawn from the external refrigerant circuit 100. The compression unit 22 and the three-phase motor 23, which serve as an electric motor, are accommodated in the housing 21.

The entire housing 21 is cylindrical. The housing 21 includes a discharge port 21b from which refrigerant is discharged.

The compression unit 22 compresses the refrigerant drawn into the housing 21 through the suction port 21a and discharges the compressed refrigerant out of the discharge port 21b. The specific structure of the compression unit 22 may be of any type such as a scroll type, a piston type, or a vane type.

The three-phase motor 23 drives the compression unit 22. The three-phase motor 23 includes, for example, a cylindrical rotation shaft 26 supported to be rotatable relative to the housing 21, a cylindrical rotor 24 fixed to the rotation shaft 26, and a stator 25 fixed to the housing 21. The rotor 24 includes a cylindrical rotor core 24b in which permanent magnets 24a are embedded. The axial direction of the rotation shaft 26 coincides with the axial direction of the cylindrical housing 21. The stator 25 includes a cylindrical stator core 25a and coils 25b wound around the teeth of the stator core 25a. The rotor 24 opposes the stator 25 in the radial direction of the rotation shaft 26.

The motor-driven compressor 20 includes an inverter unit 30. The inverter unit 30 includes an inverter device 31 that drives the three-phase motor 23 and a case 32 that accommodates the inverter device 31. The coils 25b of the three-phase motor 23 are electrically connected to the inverter device 31. The case 32 is fixed to the housing 21 by bolts 33 serving as fasteners. That is, the inverter device 31 is integrated with the motor-driven compressor 20 of the present embodiment.

The inverter device 31 includes a circuit board 34 and a power module 35 that is electrically connected to the circuit board 34. Various electronic components are arranged on the circuit board 34. A connector 36 is arranged on an outer surface of the case 32. The circuit board 34 is electrically connected to the connector 36. The connector 36 supplies the inverter device 31 with power and electrically connects the air-conditioning ECU 101 to the inverter device 31.

In this manner, the motor-driven compressor 20 includes the compression unit 22, which is arranged in the housing 21, the three-phase motor 23, which is arranged in the housing 21 and drives the compression unit 22, and the inverter device 31, which supplies the three-phase motor 23 with power.

Figure 2:
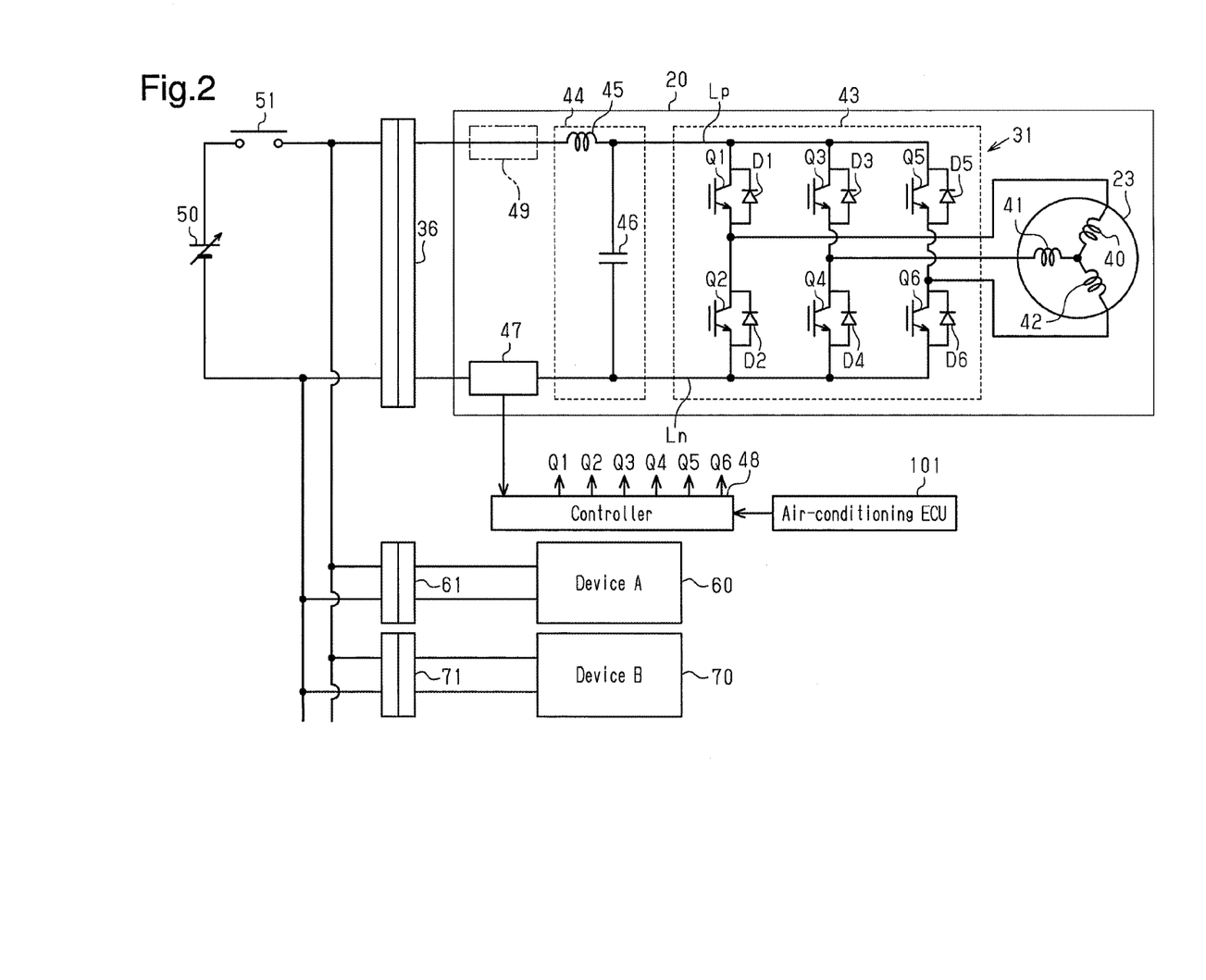
FIG. 2 is a circuit diagram of the motor-driven compressor of FIG. 1.

As shown in FIG. 2, the vehicle including the motor-driven compressor 20 includes a battery 50. Power is supplied from the battery 50 to electric devices 60 and 70 for a vehicle other than the motor-driven compressor 20.

As shown in FIG. 2, the inverter device 31 includes an inverter circuit 43, a capacitor 46 (smoothing capacitor), a current sensor 47, and a controller 48. The three-phase motor 23 includes coils 40, 41, and 42 (corresponding to coils 25b shown in FIG. 1) that are in a star connection. The controller 48 may be circuitry including one or more dedicated hardware circuits such as an application-specific integrated circuit (ASIC), one or more processors running on computer programs (software), or a combination of a hardware circuit and a processor. The processor includes a CPU and a memory such as a ROM or a RAM, which store programs executed by the CPU. The memory, or computer readable medium, includes any type of medium that is accessible by a versatile computer or a dedicated computer.

The inverter circuit 43 is connected to the battery 50 by a system main relay 51. The system main relay 51 is a positive electrode terminal contact. The battery 50 includes a positive electrode terminal connected by the system main relay 51 to a positive electrode bus bar Lp of the inverter circuit 43. Further, a negative electrode terminal of the battery 50 is connected to a negative electrode bus bar Ln of the inverter circuit 43. A vehicle ECU makes the system main relay 51 in contact when a start key of the vehicle is activated and makes the system main relay 51 out of contact when the start key is deactivated.

The inverter circuit 43 includes the positive electrode bus bar Lp, the negative electrode bus bar Ln, and bridge-connected switching elements Q1, Q2, Q3, Q4, Q5, and Q6. More specifically, the inverter circuit 43 includes six switching elements Q1 to Q6 and six diodes D1 to D6. Insulated gate bipolar transistors (IGBTs) are used as the switching elements Q1 to Q6. Instead, power metal-oxide-semiconductor field-effect transistors (MOSFETs) may be used as the switching elements Q1 to Q6. Between the positive electrode bus bar Lp and the negative electrode bus bar Ln, the switching elements Q1 and Q2 are connected in series, the switching elements Q3 and Q4 are connected in series, and the switching elements Q5 and Q6 are connected in series. The diodes D1 to D6 are connected in anti-parallel to the switching elements Q1 to Q6, respectively. The three-phase motor 23 (more specifically, coil 40) is connected between the switching elements Q1 and Q2, the three-phase motor 23 (more specifically, coil 41) is connected between the switching elements Q3 and Q4, and the three-phase motor 23 (more specifically, coil 42) is connected between the switching elements Q5 and Q6.

A control terminal (gate terminal of IGBT) of each of the switching elements Q1 to Q6 is connected to the controller 48. The controller 48 controls activation and deactivation of the switching elements Q1 to Q6. When switching control is performed on the switching elements Q1 to Q6, the inverter circuit 43 converts the direct current supplied from the battery 50 into three-phase alternating current having a suitable frequency and supplies the converted three-phase alternating current to the coils 40 to 42 for the three phases of the three-phase motor 23. That is, when switching operation is performed on the switching elements Q1 to Q6, the three-phase coils 40 to 42 of the three-phase motor 23 are supplied with current to drive the three-phase motor 23.

In this manner, in the inverter circuit 43, the switching elements Q1 to Q6 are bridge-connected between the positive electrode bus bar Lp and the negative electrode bus bar Ln, which are connected to the battery 50 serving as a DC power source. Activation and deactivation control is performed on the switching elements Q1 to Q6 so that the inverter circuit 43 converts the DC power from the battery 50 into AC power and supplies the AC power to the coils 40 to 42 of the three-phase motor 23 to drive the coils 40 to 42.

The capacitor 46 is connected to the positive electrode bus bar Lp and the negative electrode bus bar Ln at the preceding stage of the inverter circuit 43 (at side closer to battery 50). That is, the capacitor 46 is connected to the positive electrode bus bar Lp and the negative electrode bus bar Ln between the inverter circuit 43 and the battery 50. Further, a coil 45 is arranged on the positive electrode bus bar Lp between the capacitor 46 and the battery 50. The capacitor 46 and the coil 45 form an input filter 44.

In addition, the current sensor 47 is located between the capacitor 46 and the battery 50 on the negative electrode bus bar Ln. The current sensor 47 can be formed by, for example, a shunt resistor or a Hall element.

The connector 36 connects the battery 50 to the motor-driven compressor 20 so that power is supplied from the battery 50 to the motor-driven compressor 20 via the connector 36. More specifically, power is supplied to the inverter circuit 43 via the input filter 44.

A connector 61 connects the battery 50 to the electric device 60 so that power is supplied from the battery 50 to the electric device 60 via the connector 61. A connector 71 connects the battery 50 to the electric device 70 so that power is supplied from the battery 50 to the electric device 70 via the connector 71.

The operation of the embodiment will now be described.

Figure 3:
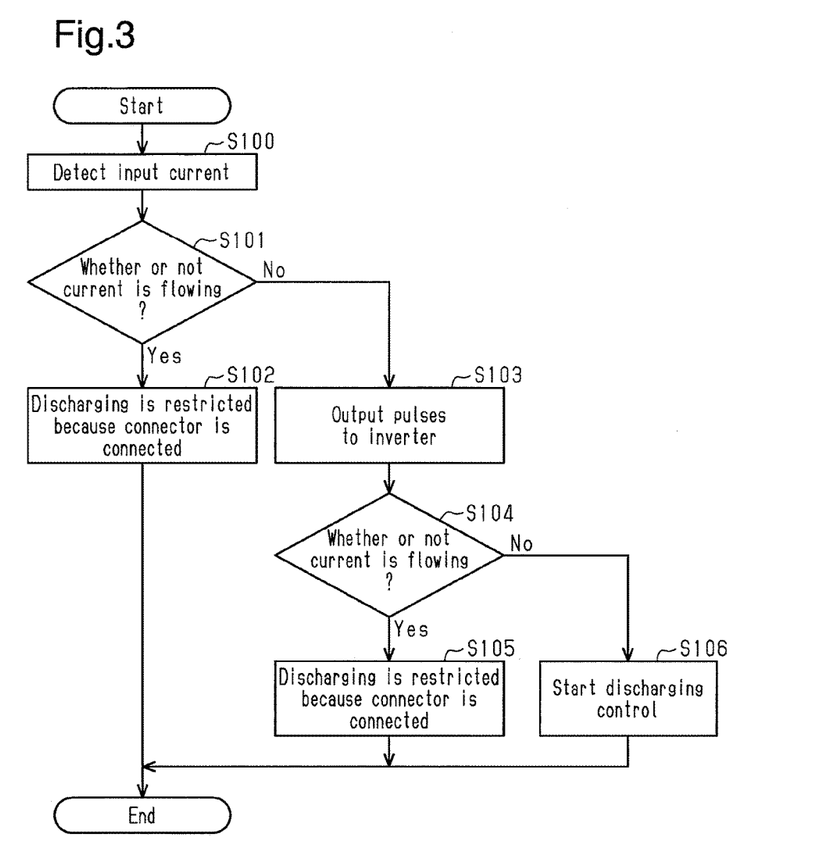
FIG. 3 is a flowchart illustrating the operation of the motor-driven compressor of FIG. 2.

The controller 48 executes the processes illustrated in FIG. 3 when the motor stops operating.

As shown in FIG. 3, in step S100, the controller 48 detects input current based on a signal from the current sensor 47. In step S101, the controller 48 detects whether or not current is flowing. For example, the controller 48 determines whether or not a value detected by the current sensor 47 is within a predetermined range. In step S100, current is detected when the electric devices 60 and 70 are connected to the battery 50 and AC components flow into the capacitor 46. For example, current ripples flowing into the inverter 43 are detected when the electric devices 60 and 70 are operating. This indicates that the connector 36 and at least one of the connector 61 and the connector 71 are connected to the motor-driven compressor 20 and the battery 50, that is, an input line is connected to the motor-driven compressor 20 and the battery 50. In other words, step S101 allows for the detection of non-operation of the electric devices 60 and 70 or disconnection of the connectors 61 and 71 (breakage of power input line).

Figure 4:
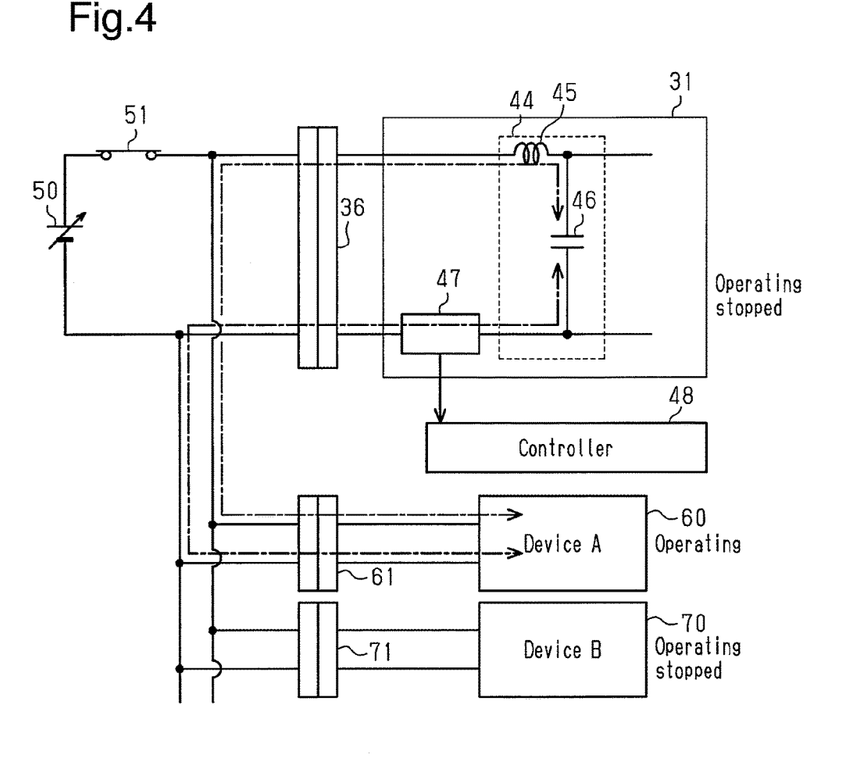
FIG. 4 is a circuit diagram illustrating the operation of the motor-driven compressor of FIG. 2.

When the current sensor 47 detects the flow of current in step S101, the controller 48 proceeds to step S102 and restricts discharging of the capacitor 46. That is, the capacitor 46 is not discharged because the connector 36 and at least one of the connector 61 and the connector 71 is connected to the motor-driven compressor 20 and the battery 50 (connector is connected). More specifically, as shown in FIG. 4, current flows between the electric device 60 and the capacitor 46 via the connectors 36 and 61 when the inverter device 31 and the three-phase motor 23 stop driving, the electric device 60 is operating, and the electric device 70 stops operating.

In this manner, when the current sensor 47 detects current, the controller 48 determines that the electric device 60 is operating and current (for example, current ripple) is flowing into the motor-driven compressor 20, that is, the input line is connected to the motor-driven compressor 20 and the battery 50. In this case, the capacitor 46 is not discharged.

Figure 5:
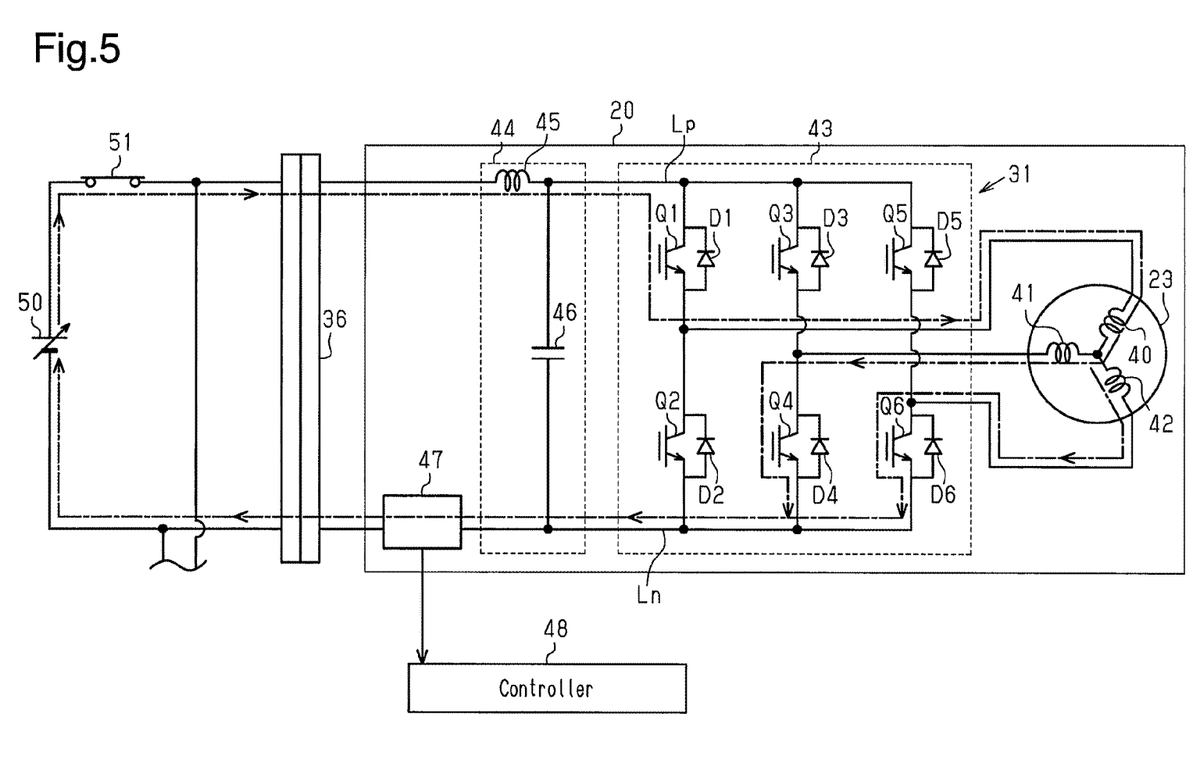
FIG. 5 is a circuit diagram illustrating the operation of the motor-driven compressor of FIG. 2.

When the current sensor 47 does not detect the flow of current in step S101 of FIG. 3, the controller 48 proceeds to step S103 and outputs pulses to gates of the switching elements Q1 to Q6 of the inverter circuit 43 to control the switching elements Q1 to Q6. For example, as shown in FIG. 5, the controller 48 activates the U-phase upper arm switching element Q1, the V-phase lower arm switching element Q4, and the W-phase lower arm switching element Q6.

Then, the controller 48 proceeds to step S104 in FIG. 3 and determines whether or not the current sensor 47 has detected the flow of current. For example, the controller 48 determines whether or not a value detected by the current sensor 47 is within a predetermined range. In step S104, the controller 48 uses the current sensor 47 to check a response to the output of pulses to the gates of the switching elements Q1 to Q6 of the inverter circuit 43.

When the current sensor 47 detects the flow of current in step S104, the controller 48 proceeds to step S105 and restricts discharging of the capacitor 46. That is, since the connector 36 is connected to the motor-driven compressor 20 and the battery 50 (connector is connected), the capacitor 46 is not discharged. More specifically, as shown in FIG. 5, when the battery 50 and the motor-driven compressor 20 are connected by the connector 36, the controller 48 activates the U-phase upper arm switching element Q1, the V-phase lower arm switching element Q4, and the W-phase lower arm switching element Q6. As a result, current flows through a path in the order of the battery 50, the bus bar Lp, the U-phase upper arm switching element Q1, the coil 40, the coil 41, the V-phase lower arm switching element Q4, the bus bar Ln, and the battery 50 and through a path in the order of the battery 50, the bus bar Lp, the U-phase upper arm switching element Q1, the coil 40, the coil 42, the W-phase lower arm switching element Q6, the bus bar Ln, and the battery 50. Thus, the controller 48 determines that the current sensor 47 has detected the flow of current.

Figure 6:
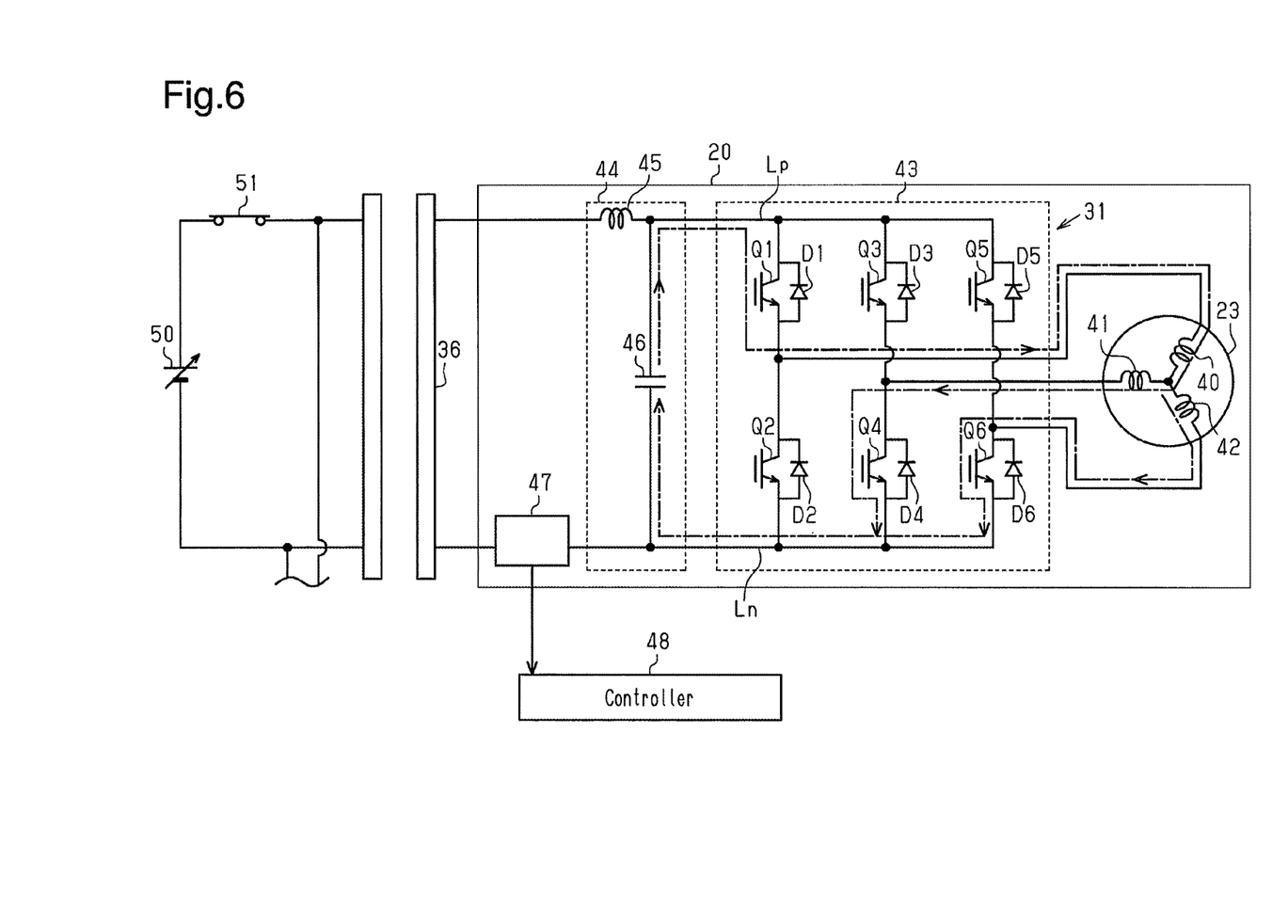
FIG. 6 is a circuit diagram illustrating the operation of the motor-driven compressor of FIG. 2.

In step S104 shown in FIG. 3, when the controller 48 determines that the current sensor 47 has not detected the flow of current, the controller 48 determines that the connector has been disconnected (power input line has been broken). Then, the controller 48 proceeds to step S106 and starts discharging the capacitor 46. More specifically, as shown in FIG. 6, when the connector 36 is disconnected from and not connected to the battery 50, the controller 48 activates the U-phase upper arm switching element Q1, the V-phase lower arm switching element Q4, and the W-phase lower arm switching element Q6. As a result, current flows through a path in the order of the capacitor 46, the bus bar Lp, the U-phase upper arm switching element Q1, the coil 40, the coil 41, the V-phase lower arm switching element Q4, the bus bar Ln, and the capacitor 46 and through a path in the order of the capacitor 46, the bus bar Lp, the U-phase upper arm switching element Q1, the coil 40, the coil 42, the W-phase lower arm switching element Q6, the bus bar Ln, and the capacitor 46. Thus, the controller 48 determines that the current sensor 47 has not detected the flow of current.

In step S106 shown in FIG. 3, the controller 48 starts controlling the switching elements Q1 to Q6 to start energizing the coils 40 to 42 of the motor. This starts discharging the capacitor 46.

More specifically, in step S101 shown in FIG. 3, when the current sensor 47 does not detect the flow of current, the controller 48 cannot determine whether the electric devices 60 and 70 are all deactivated or the connector 36 is disconnected. Thus, the controller 48 outputs pulses to the gates of the switching elements (Q1 to Q6), and the current sensor 47 detects the response to the output. When the current sensor 47 detects the flow of current, that is, when the current sensor 47 detects current, the controller 48 determines that the motor-driven compressor 20 is connected to an external device (for example, battery 50). In this case, the capacitor 46 is not discharged. When the current sensor 47 does not detect the flow of current, that is, when the current sensor 47 does not detect current, the controller 48 determines that a line breakage has occurred because of the disconnection of the connector 36 or the like and starts discharging the capacitor 46.

Figure 7:
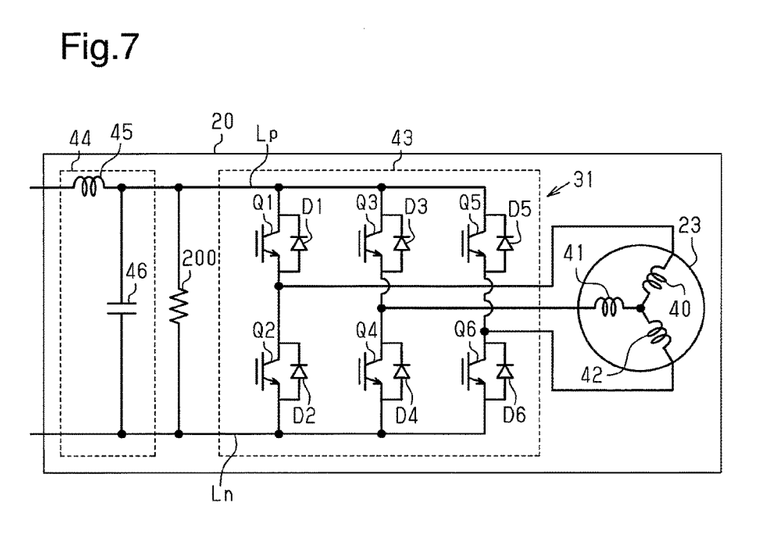
FIG. 7 is a circuit diagram of a comparative example.

FIG. 7 is a comparative example.

As shown in FIG. 7, in a motor-driven compressor for a vehicle, when the input voltage is interrupted, the connector is disconnected, or the input line is broken, a discharge resistor 200 connected in parallel to the capacitor 46 of the input filter 44 discharges residual electric charges that remain in the capacitor 46. In this case, the discharge resistor 200 is connected in parallel to the capacitor 46. Thus, the discharge resistor 200 consumes power during normal operation. This may lower the efficiency of the motor-driven compressor, heat the discharge resistor 200, or damage elements located near the discharge resistor 200.

The present embodiment includes the current sensor 47 located between the input filter (capacitor 46) and the battery 50. When the current sensor 47 does not detect the flow of current, the controller 48 serving as a determination means controls the switching elements Q1 to Q6 and determines during the control whether or not the current sensor 47 has detected the flow of current. When the controller 48 determines that current is not flowing, the controller 48 serving as a discharge starting means starts discharging the capacitor 46.

More specifically, when the input voltage is interrupted, the connector is disconnected, or the input line is broken when the motor is operating, the motor continues to operate. This allows the capacitor 46, which is charged by the coils 40 to 42 of the motor, to be discharged. However, electric charges cannot be consumed when the motor stops operating. Thus, if interruption of the input voltage, disconnection of the connector, or breakage of the input line is detected when the motor stops operating, current is supplied to the coils 40 to 42 of the motor subsequent to the detection to discharge the residual electric charges from the capacitor 46. Thus, in order to detect interruption of the input voltage or the like when the motor stops operating, the current sensor 47 is arranged at the outer side of the input filter 44. This allows for detection of interruption of the input voltage or the like based on whether or not current is flowing to the current sensor 47.

In this manner, discharge control is executed when detecting that discharging is necessary without elements being damaged by heat and without the efficiency being lowered by the discharge resistor 200.

In other words, disconnection of the connector is determined when the current sensor 47 located between the connector 36 and the capacitor 46 does not detect the flow of current and the current sensor 47 also does not detect the flow of current even though pulses are applied to the gates of the switching elements Q1 to Q6 of the inverter circuit. Accordingly, since the discharge resistor 200 is not used, that is, since the configuration is without a resistor, the efficiency and reliability are high.

The above embodiment has the advantages described below.

(1) The inverter device 31 includes the controller 48, and the controller 48 serves as the determination means and the discharge starting means. If the current sensor 47 does not detect the flow of current when the motor stops operating, the controller 48 serving as the determination means controls the switching elements Q1 to Q6. During the control, the controller 48 determines whether or not the current sensor 47 has detected the flow of current. When the determination means determines that current is not flowing, the controller 48 serving as the discharge starting means starts discharging the capacitor 46. Thus, since a discharge resistor is not connected in parallel to the capacitor 46, power consumption is reduced, and the discharging of the capacitor 46 is started when a power source line that supplies the inverter circuit 43 with power is interrupted when the motor stops operating.

(2) When the determination means determines that current is not flowing, the controller 48 serving as the discharge starting means starts controlling the switching elements Q1 to Q6 and starts energizing the coils 40 to 42 of the motor. This starts discharging the capacitor 46. Thus, the discharging of the capacitor 46 can be easily started by starting the energizing of the coils 40 to 42. This allows discharging to be performed without a dedicated discharge resistor.

(3) The electric devices 60 and 70 and the motor-driven compressor 20 are connected to the battery 50. In this case, current flows from the electric devices 60 and 70 to the motor-driven compressor 20. Thus, current is determined to be flowing in step S101 of FIG. 3. This eliminates the need to execute the processes of steps S103, S104, and S105 and indicates that the connector 36 is connected to the motor-driven compressor 20 and the battery 50.

It should be apparent to those skilled in the art that the present invention may be embodied in many other specific forms without departing from the spirit or scope of the invention. Particularly, it should be understood that the present invention may be embodied in the following forms.

The current sensor 47 is located between the capacitor 46 and the battery 50 on the negative electrode bus bar Ln. Instead, as shown by the double-dashed lines in FIG. 2, instead of the current sensor 47, a current sensor 49 may be arranged on the positive electrode bus bar Lp between the capacitor 46 and the battery 50.

The controller 48 serving as the discharge starting means starts discharging the capacitor 46 when starting the energizing of the coils 40 to 42 of the motor. Instead, for example, a series circuit including a resistor and a switch may be connected between the positive electrode bus bar Lp and the negative electrode bus bar Ln. In this case, discharging is started when the switch closes the circuit of the switch so that current flows to the resistor and discharges the capacitor 46.

The coil 45 may be omitted.

Therefore, the present examples and embodiments are to be considered as illustrative and not restrictive and the invention is not to be limited to the details given herein, but may be modified within the scope and equivalence of the appended claims.

The invention claimed is:

1. A motor-driven compressor for a vehicle comprising:
a housing;
a compression unit arranged in the housing;

a motor arranged in the housing and configured to drive the compression unit; and an inverter device that supplies the motor with power, wherein the inverter device includes an inverter circuit including a plurality of switching elements that are bridge-connected between a positive electrode bus bar and a negative electrode bus bar that are connected to a DC power source, wherein the inverter circuit is configured to drive the motor by executing activation and deactivation control on the switching elements to convert DC power from the DC power source into AC power and supply the AC power to a coil of the motor, a capacitor connected to the positive electrode bus bar and the negative electrode bus bar between the inverter circuit and the DC power source, a current sensor located between the capacitor and the DC power source on the positive electrode bus bar or the negative electrode bus bar, a determination means configured to control the switching elements in response to the current sensor not detecting a flow of current when the motor stops operating and configured to determine whether or not the current sensor detects a flow of current when controlling the switching elements, and a discharge starting means configured to start discharging the capacitor when the determination means determines that the flow of current has not been detected.

2. The motor-driven compressor according to claim 1, wherein when the determination means determines that the flow of current has not been detected, the discharge starting means is configured to start controlling the switching elements and start energizing the coil of the motor in order to start discharging the capacitor.

3. A motor-driven compressor for a vehicle comprising:
a housing;
a compression unit arranged in the housing;
a motor arranged in the housing and configured to drive the compression unit; and
an inverter device that supplies the motor with power, wherein the inverter device includes an inverter circuit including a plurality of switching elements that are bridge-connected between a positive electrode bus bar and a negative electrode bus bar that are connected to a DC power source, wherein the inverter circuit is configured to drive the motor by executing activation and deactivation control on the switching elements to convert DC power from the DC power source into AC power and supply the AC power to a coil of the motor, a capacitor connected to the positive electrode bus bar and the negative electrode bus bar between the inverter circuit and the DC power source, a current sensor located between the capacitor and the DC power source on the positive electrode bus bar or the negative electrode bus bar, and circuitry, wherein the circuitry is configured to control the switching elements in response to the current sensor not detecting a flow of current when the motor stops operating and is configured to determine whether or not the current sensor detects a flow of current when controlling the switching elements, and the circuitry is configured to start discharging the capacitor when determining that the flow of current has not been detected.

4. The motor-driven compressor according to claim 3, wherein when the circuitry determines that the flow of current has not been detected, the circuitry is configured to start controlling the switching elements and start energizing the coil of the motor in order to start discharging the capacitor.

* * * * *